United States Patent
Starke et al.

(10) Patent No.: US 9,022,323 B2
(45) Date of Patent: May 5, 2015

(54) SALVAGING AND BRAKING DEVICE FOR OBJECTS FLYING FREELY IN SPACE

(75) Inventors: Juergen Starke, Bremen (DE); Bernhard Bischof, Granderkesee (DE); Josef Sommer, Weyhe (DE); Michael Dumke, Bad Oldesloe (DE); Uwe Bruege, Bremen (DE)

(73) Assignee: Astrium GmbH, Taufkirchen (DE)

( * ) Notice: Subject to any disclaimer, the term of this patent is extended or adjusted under 35 U.S.C. 154(b) by 95 days.

(21) Appl. No.: 13/824,329

(22) PCT Filed: Feb. 29, 2012

(86) PCT No.: PCT/DE2012/000229
§ 371 (c)(1),
(2), (4) Date: Mar. 15, 2013

(87) PCT Pub. No.: WO2012/119588
PCT Pub. Date: Sep. 13, 2012

(65) Prior Publication Data
US 2013/0175401 A1 Jul. 11, 2013

(30) Foreign Application Priority Data
Mar. 8, 2011 (DE) .......................... 10 2011 013 875

(51) Int. Cl.
*B64G 1/10* (2006.01)
*B64G 1/62* (2006.01)
(Continued)

(52) U.S. Cl.
CPC ............... *B64G 1/1078* (2013.01); *B64G 1/62* (2013.01); *B64G 1/646* (2013.01); *B64G 1/40* (2013.01); *B64G 1/007* (2013.01)

(58) Field of Classification Search
USPC .......... 244/158.1, 158.2, 158.6, 159.4, 171.1, 244/171.7, 172.4, 172.5; 89/1.11
See application file for complete search history.

(56) References Cited

U.S. PATENT DOCUMENTS 3,277,826 A * 10/1966 Silverthorne ................. 102/377
4,083,520 A 4/1978 Rupp et al.
(Continued)

FOREIGN PATENT DOCUMENTS

DE 103 42 953 4/2005
DE 103 42 954 4/2005
(Continued)

OTHER PUBLICATIONS

International Search Report of the International Searching Authority for International Application PCT/DE2012/000229, mailed Jul. 3, 2012, 3 pages, European Patent Office, HV Rijswijk, Netherlands.
(Continued)

*Primary Examiner* — Joseph W Sanderson
(74) *Attorney, Agent, or Firm* — W. F. Fasse

(57) ABSTRACT

For capturing satellites and other orbital objects, one or more independent capturing units are releasably arranged on a spacecraft serving as a steerable carrier vehicle. Each capturing unit has a propellant charge and at least one braking thrust nozzle of its own, and a closeable capture net releasably connected to the capturing unit via a tether line. The net is deployed from the capturing unit to capture the orbital object. Position or attitude control engines of the carrier vehicle are operated for orienting the combination including the capturing unit and the orbital object captured in the net. The capturing unit is then released from the carrier vehicle, and applies a braking thrust to the captured object so as to deorbit the captured object together with the capturing unit.

18 Claims, 4 Drawing Sheets

(51) Int. Cl.
*B64G 1/64* (2006.01)
*B64G 1/40* (2006.01)
*B64G 1/00* (2006.01)

(56) References Cited

U.S. PATENT DOCUMENTS

| | | | |
|---|---|---|---|
| 4,712,753 A | 12/1987 | Howard | |
| 4,750,692 A | 6/1988 | Howard | |
| 5,299,764 A | 4/1994 | Scott | |
| 5,421,540 A * | 6/1995 | Ting | 244/158.1 |
| 5,583,311 A * | 12/1996 | Rieger | 89/1.11 |
| 6,299,107 B1 | 10/2001 | Kong et al. | |
| 6,523,784 B2 | 2/2003 | Steinsiek et al. | |
| 6,626,077 B1 * | 9/2003 | Gilbert | 89/1.11 |
| 6,655,637 B1 | 12/2003 | Robinson | |
| 7,168,660 B2 | 1/2007 | Bischof et al. | |
| 7,207,525 B2 | 4/2007 | Bischof et al. | |
| 7,328,644 B2 * | 2/2008 | Vickroy | 89/1.11 |
| 7,786,417 B2 * | 8/2010 | Sells, II | 244/3.1 |
| 8,205,537 B1 * | 6/2012 | Dupont | 89/1.34 |
| 8,356,774 B1 * | 1/2013 | Banik et al. | 244/159.5 |
| 8,387,540 B2 * | 3/2013 | Merems | 102/501 |
| 8,399,816 B2 * | 3/2013 | Glasson | 244/3.1 |
| 8,485,475 B2 * | 7/2013 | Allen et al. | 244/158.2 |
| 2004/0031885 A1 | 2/2004 | D'Ausilio et al. | |
| 2004/0245407 A1 | 12/2004 | D'Ausilio et al. | |
| 2005/0151022 A1 | 7/2005 | D'Ausilio et al. | |

FOREIGN PATENT DOCUMENTS

| | | |
|---|---|---|
| DE | 102004004543 | 9/2005 |
| JP | 07-251799 A | 10/1995 |

OTHER PUBLICATIONS

PCT International Preliminary Report on Patentability including English Translation of PCT Written Opinion of the International Searching Authority for International Application PCT/DE2012/000229, issued Sep. 10, 2013, 5 pages, International Bureau of WIPO, Geneva, Switzerland.

* cited by examiner

SALVAGING AND BRAKING DEVICE FOR OBJECTS FLYING FREELY IN SPACE

FIELD OF THE INVENTION

The invention relates to a recovery and braking device for objects flying freely in space, particularly for capturing satellites and other orbital objects, consisting of a spacecraft serving as a steerable carrier vehicle equipped with at least one position or attitude controlling engine, wherein at least one removable or separable capturing unit, which is equipped with at least one propellant charge of its own and a capture device in the form of a closeable capture net, is arranged connected to the carrier vehicle and to be launched therefrom.

BACKGROUND INFORMATION

Devices of this type have the function to capture target objects flying freely in space, for example a satellite, the upper stage of a rocket or any other type of space junk. Generally such devices are activated from onboard an orbital platform located in space. Thus a device of the type mentioned at the beginning has become known from DE 103 42 954 B4, wherein a capture net is provided that comprises weights on its outer edge: At the start or launch out of an ejecting apparatus arranged on the orbital station an impulse is imparted to the net in such a manner, so that it then automatically opens due to the inertia acting on the weights. In addition robotic systems, i.e. mechanical grasper devices that are arranged on a free-flying system which is in turn connected to an orbital platform, have also become known for this application or purpose. Such a device is described, for example, in DE 103 42 953 B4.

Moreover, from JP 7 251 799 A, a device of the type mentioned at the beginning has become known, with the help of which orbital elements, i.e. debris, are to be captured, transferred to the carrier vehicle and received there. The system consisting of a carrier vehicle and several capturing units remains in orbit with the captured debris elements, i.e. it returns with these back to a space station from which it was launched.

SUMMARY OF THE INVENTION

It is the object of the present invention to embody such a device in such a manner so that it enables a return to earth with the objects captured with this device in a simple and reliable manner.

The above object has been achieved according to an embodiment of the invention by providing in such a device, that each capturing unit is releasably connected with the capture net via a tether line, and that the propellant charge is equipped with at least one thrust nozzle embodied as a braking device.

After completed execution of a capturing maneuver with a recovery device according to an embodiment of the invention, a then undocked capturing unit is thus able, via a flexible connection, to force a near-earth, massive and uncooperative body, for example a satellite, a rocket upper stage or a large fragment, to a re-entry into the earth's atmosphere with a defined target area on the earth's surface. In consideration of the system behavior of the flexibly coupled objects, a sufficient position stability and accuracy is ensured, also without an active position control, when a pulling force is applied.

An embodiment of the invention makes possible the targeted re-entry of the respective capturing unit and of the object captured therewith, with the least possible complexity, whereby such a capturing unit is used only for one maneuver, and for an efficient overall mission several such capturing units are provided on one recovery device. In that regard also, mass savings have a positive effect on the mass budget of the overall mission by omitting sub-systems that are not absolutely necessary on the individual capturing units and concentrating them on the carrier vehicle, just as this also makes possible cost savings in the construction of the entire recovery device.

Thus an embodiment of the invention makes it possible to safely and reliably remove from the space environment, satellites and other orbital objects that are not able themselves to force their own re-entry. This enables a significant reduction of the hazard potential for collisions, particularly in highly frequented orbits for earth observation, thus increasing the safety of space travel in general.

Furthermore, movements of the target object in limited form are not critical for the functioning of the recovery device according to the invention. Also, with the embodiment of the thrust nozzle as a braking device provided according to an embodiment of the invention, a safe distance between the target object and the recovery device can be maintained at all times. Finally, in further embodiments, several capturing units can be combined into a series or parallel connection.

BRIEF DESCRIPTION OF THE DRAWINGS

In the following, the invention shall be further described with reference to example embodiments illustrated in the drawing. It is shown by FIG. 1 a schematic illustration of the construction of a recovery device in front view, FIG. 2 a schematic illustration of a mission of the recovery device according to FIG. 1, FIGS. 3 and 4 different phases of a capturing maneuver by a recovery device according to FIG. 1, FIG. 5 an overview of a system consisting of a capturing unit and a captured object, and FIG. 6 possible orbit altitudes of a system consisting of a capturing unit and a captured object, which would lead to a direct re-entry.

DETAILED DESCRIPTION OF EXAMPLE EMBODIMENTS OF THE INVENTION

Figure 1:
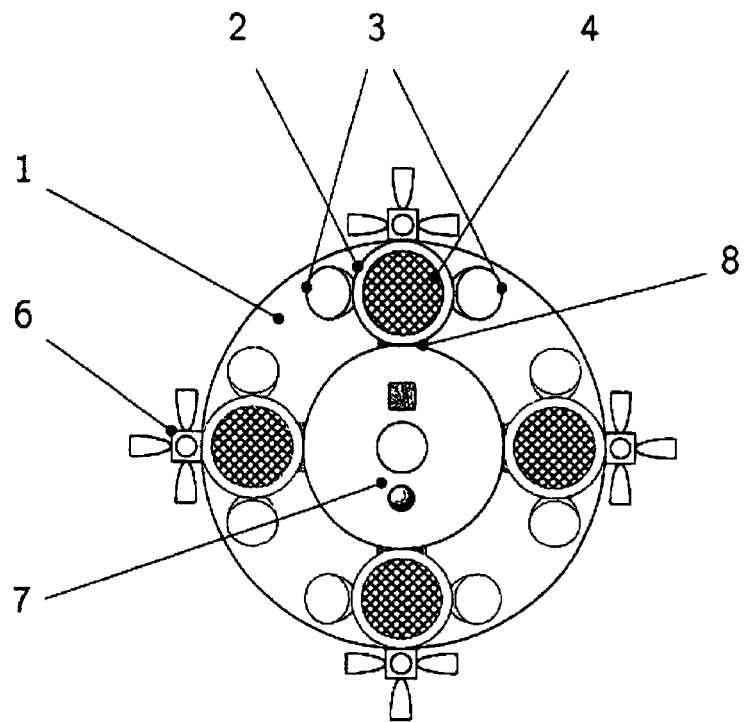

In FIG. 1 a front view of the recovery device is schematically illustrated, consisting of a carrier vehicle 1 on which removable or separable capturing units 2 are attached. The latter each respectively contain a propellant charge and are equipped with thrust nozzles 3. In the example embodiment illustrated here, each capturing unit 2 carries an initially folded net 4, which unfolds after it has been ejected out of the capturing unit 2 and then the single net 4 remains connected to the single capturing unit 2 by a single cable 5 not visible in this Figure but shown in FIGS. 2 to 5. The carrier vehicle 1, on which the capturing units 2 are arranged, is further provided with (four in the case of the example embodiment described here) position controlling engines 6 arranged circumferentially distributed, as well as with a navigation unit 7. The capturing units 2 are releasably mounted on the carrier vehicle 1 via holding devices 8 embodied as connection clamps.

Figure 2:
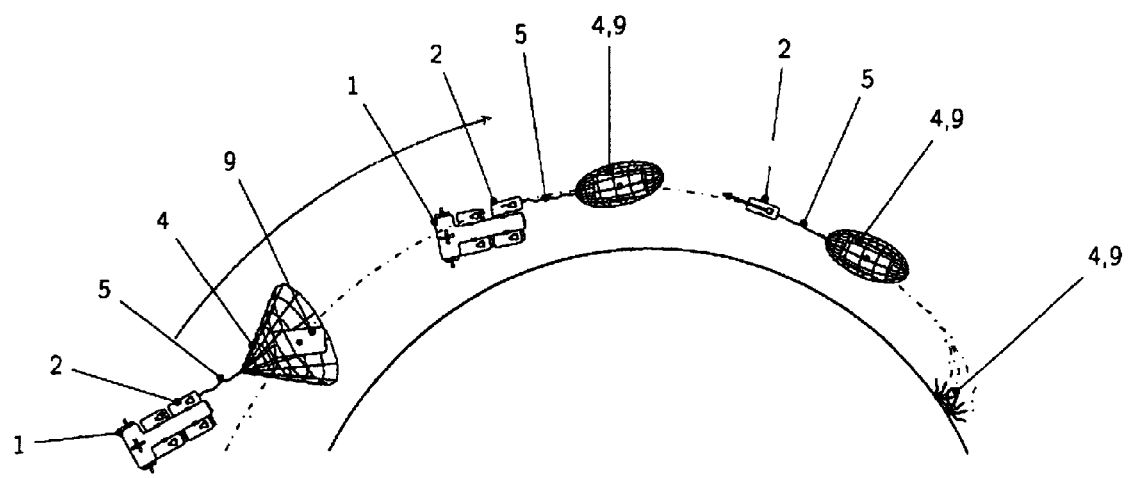

In FIG. 2 an exemplary mission of the previously described recovery device, the capturing of an object 9 moving in an uncontrolled manner in space, is illustrated in schematic form. The mission begins with a maneuver of the carrier vehicle 1, which, with the position controlling engines 6 and the navigation unit 7, has all necessary systems for an active control of its position and attitude, in order to carry out those orbit maneuvers that are necessary to approach and pursue objects 9 in orbits.

Once the carrier vehicle 1, with the support of its optical, laser-supported or radar-based navigation unit 7, has flown to or approached the object 9 to be captured, it remains in a prescribable distance to this object 9. The now following capturing maneuver is illustrated in detail in FIGS. 3 and 4. For carrying out this maneuver, the capturing unit 2 provided for the execution, if applicable in order to take into account the opening angle of the casting of the net, first has to be transported from its initial position to a forward position at the front edge of the carrier vehicle 1 where the capture net is then deployed.

Figure 3:
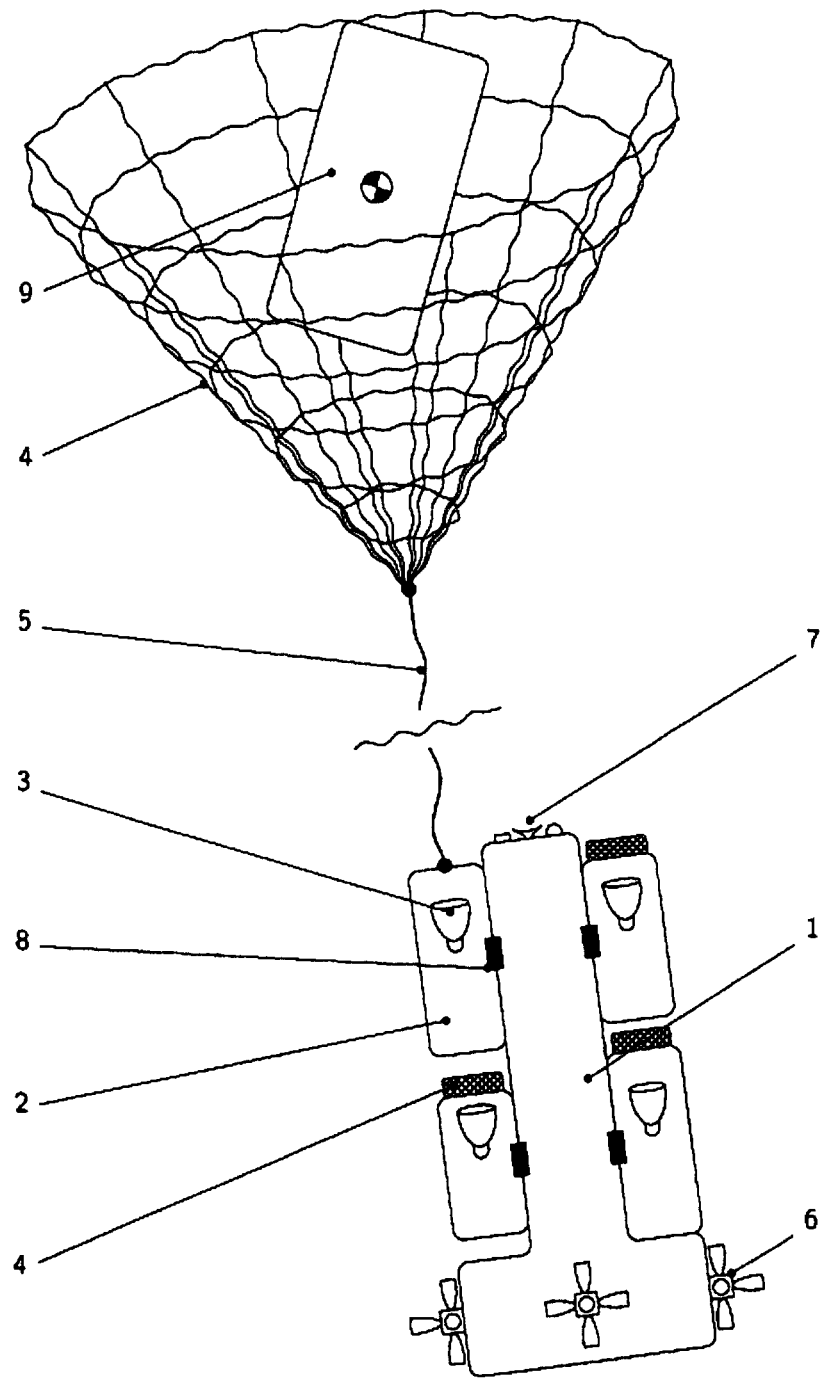
Figure 4:
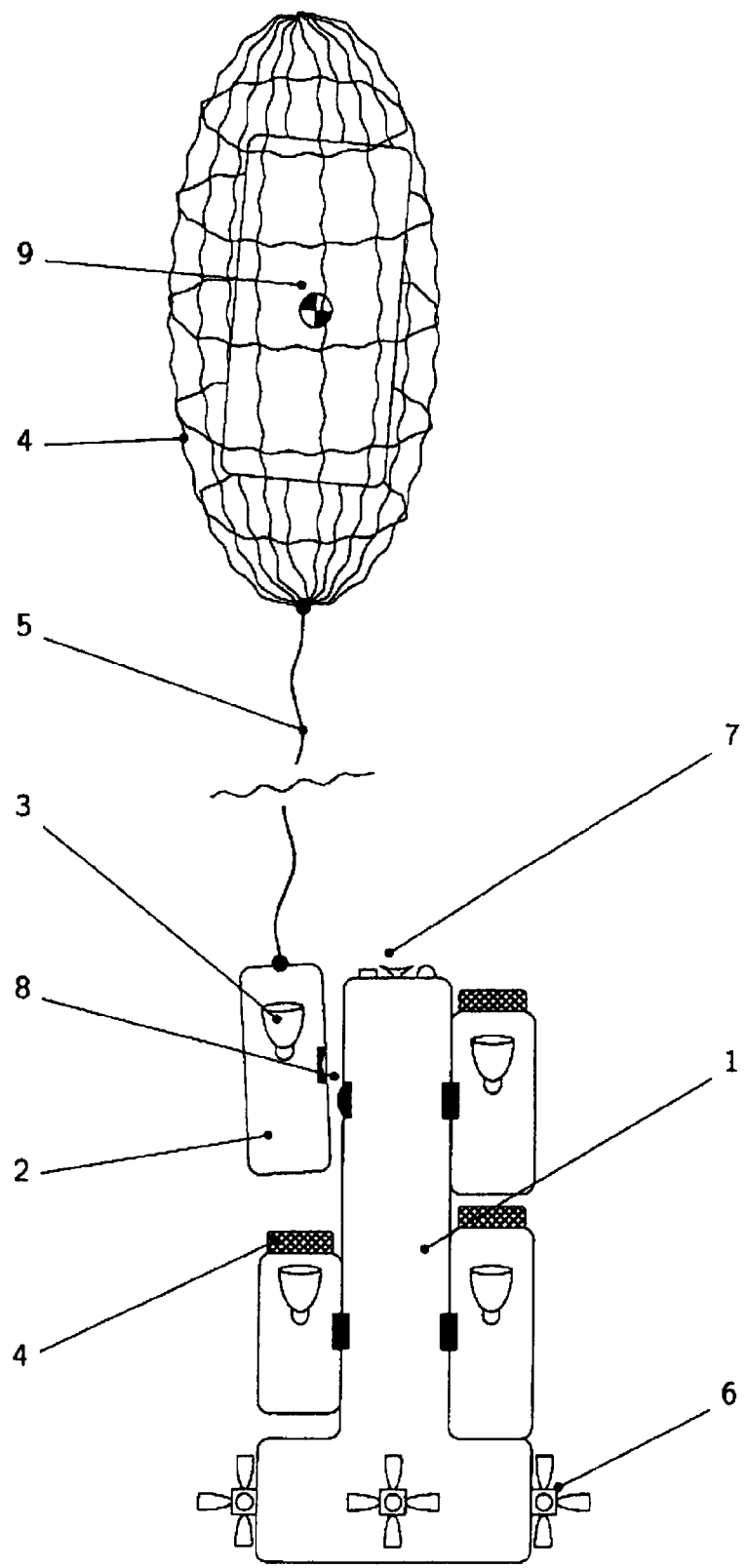

The aligned or oriented capturing unit 2 of the carrier vehicle 1 now ejects the net 4 located in the capturing unit, which net lays itself around the object 9 to be captured and which then automatically closes on the opposite side. As can be seen in FIGS. 2, 3 and 4, the capture net has no discrete masses attached to an open perimeter thereof. Via the single cable 5 attached to a closed central apex of the net 4 opposite the open end or side of the net 4 as shown in FIGS. 2 and 3, the single net 4 remains connected with the single capturing unit 2 that is still connected or mounted to the carrier vehicle 1. With the help of the flexible connection between the object 9 and the capturing unit 2, the object 9 is stabilized and aligned or oriented for the braking maneuver against the flight direction, in that the carrier vehicle 1 tightens and relaxes the cable 5 at the right moment by means of thrust impulses of the position controlling engines 6.

In the optimal case, the capturing unit 2 and the object 9 to be captured take up a horizontal and stable position or attitude at the end of the maneuver. The capturing unit 2, which has still been docked to the carrier vehicle 1 until then, is now released from the carrier vehicle 1 via the releasable connection clamp 8 and thus represents a separate smaller spacecraft. From this time point on the system of capturing unit 2 and object 9 to be captured is independent, and no more mechanical connection to the carrier vehicle 1 exists, as recognizable in FIG. 5. However, after the undocking a radio connection between the carrier vehicle 1 and the capturing unit 2 is established in order at least to initiate the ignition of the engine located in the capturing unit 2, and at the same time data or command transmissions for mission extensions can also be processed via this connection. Although alternatively thereto a direct radio path from the capturing unit 2 to a ground station is possible, this would however noticeably increase the complexity of the entire system and at the same time would provide no substantial advantages in comparison to the version described herein, in which the carrier vehicle 1 is used as a relay station.

The capturing units 2 are structurally built as simple as possible and consist mainly of a propellant charge for a rocket engine, a control electronics kept simple for the ignition sequence of this engine, and if necessary, a mechanism for severing the cable 5. The capturing units 2 possess neither systems for the position or attitude determination nor for the position or attitude control, a simple system for the positioning on the basis of a satellite navigation system can, however, be provided to initiate the separation process on the basis of its position data.

Figure 5:
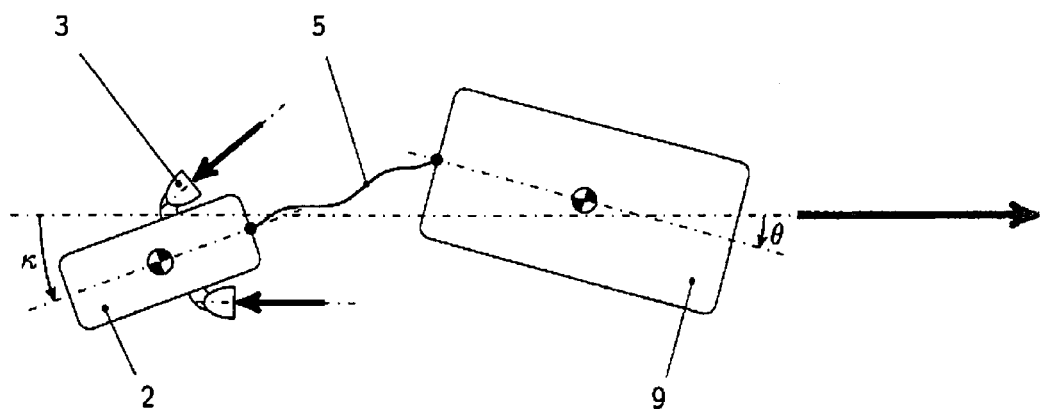

As a basic requirement for successfully carrying out the capturing and braking maneuver, the capturing unit 2 and the object 9 to be captured may comprise only a slight deviation from the common orbit and also only slight rotational residual velocities, that is, they must be aligned or oriented nearly horizontally as schematically shown in FIG. 5. Therefore, the angles $\kappa$ and $\theta 0$ illustrated in FIG. 5 must be kept as small as possible before the release of the capturing unit 2.

After the carrier vehicle 1 has left the danger zone and the correct time point for the re-entry maneuver is reached, the ignition command is transmitted and thrust is produced with the use of a solid propellant engine described herein as long as propellant is present in the capturing unit 2. The thrust force acting against the flight direction and opposite the capture net and particularly opposite the open end or side of the net as shown in FIG. 5, leads to an orbit descent trajectory that leads to a re-entry through a single maneuver. A stabilization after the maneuver is not necessary, collisions are allowed.

Figure 6:
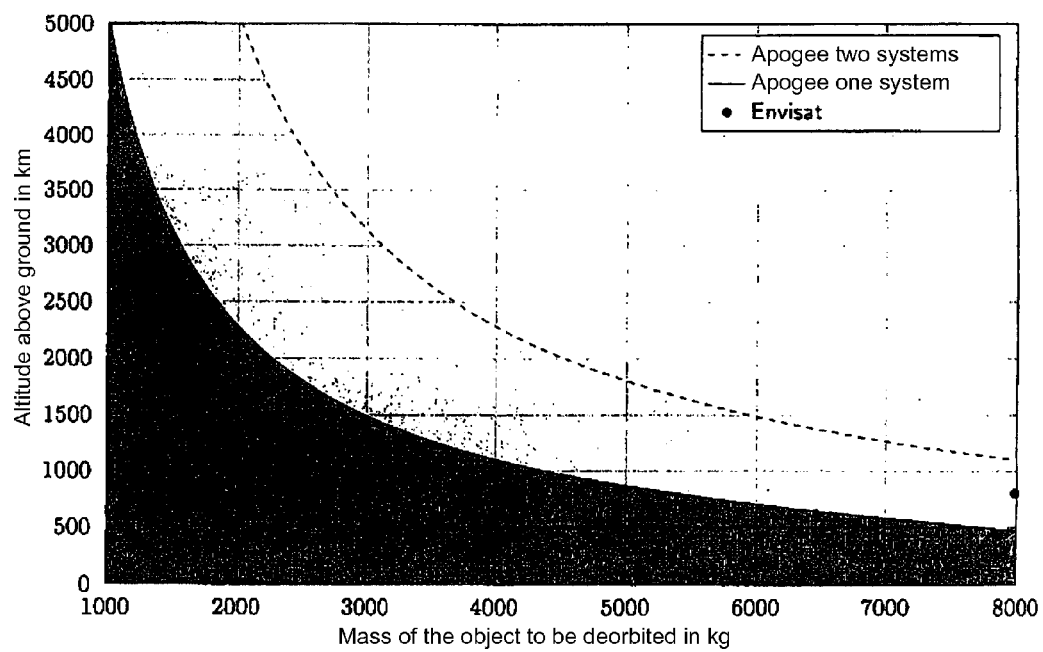

FIG. 6 shows orbit altitudes from which a system consisting of a capturing unit 2 and a captured object 9 of variable mass, can be forced to a targeted re-entry, with an assumed mass of the capturing unit 2 of approximately 650 kg in the case of the example embodiment described here.

In order to be able to restrict or limit the landing area for the unburned fragments of the object, the propellant mass of the capturing unit 2 is adapted to the mass of the object 9 to be recovered as exactly as possible, or the orbit altitude in which the propellant charge is ignited is selected in such a manner so that with a predetermined propellant mass the desired impact area is met. The latter is illustrated in FIG. 6 for a capturing unit with a solid propellant mass of 500 kg.

Furthermore, a series or parallel connection of several capturing units 2 or an adapted size of the individual capturing units 2 or their propellants is possible in order to directly de-orbit extremely heavy objects from high altitude orbits. Envisat, a satellite weighing approximately eight tons, at the end of its mission can be forced directly to re-entry in this manner using two capturing units 2 of the propellant mass assumed here. For constellations of one or two capturing units 2 and a captured object 9 that lie directly on one of the two curves illustrated in FIG. 6, the re-entry is achieved at an entry angle of two degrees in an altitude of 120 km, which is the minimum criterium for an ensured or secure re-entry.

The provision of a mechanism for cutting the connection cable between the capturing unit 2 and the captured object 9 is also possible to be able to limit the landing area more exactly. In this case the propellant mass is calculated with a reserve which serves to balance the thrust losses caused by the self-movement of the capturing unit 2. As long as fewer losses arise in the burn phase of the engine of the capturing unit 2 than in an assumed worst case scenario, then the system consisting of the capturing unit 2 and the captured object 9 has a higher orbit changing potential than needed. This could lead to missing the intended landing area if the connection between the capturing unit 2 and the captured object 9 is not severed at the right moment. Thereby the object 9 is no longer accelerated and flies very close to the intended re-entry orbit as opposed to the capturing unit 2 whose engine may change the entry path until burnout. By a suitable selection of the materials used for the construction of the capturing unit 2, the complete burn-up thereof during re-entry into the earth's atmosphere can be guaranteed with high certainty.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

The invention claimed is:

1. A recovery and braking device for capturing orbital objects flying freely in space, comprising
   a spacecraft serving as a steerable carrier vehicle, and
   at least one capturing unit releasably mounted on and releasable from the carrier vehicle,
   wherein:
   the carrier vehicle is equipped with at least one position or attitude controlling engine,
   each said capturing unit is respectively equipped with at least one propellant charge and a closeable capture net,
   each said capturing unit is respectively releasably connected via a single tether line to a closed central apex of the capture net, wherein a respective single one of said capture net is connected by said single tether line to only a single said capturing unit, and
   the propellant charge is equipped with at least one thrust nozzle effective as a braking device.

2. The recovery and braking device according to claim 1, wherein four of said capturing units are mounted on the carrier vehicle.

3. The recovery and braking device according to claim 2, wherein a plurality of said capturing units are combined in a series or parallel connection with one another.

4. A system for capturing and deorbiting an orbital object, comprising:
   a carrier vehicle equipped with at least one engine and at least one engine nozzle configured and arranged for at least one of position control and attitude control; and
   at least one capturing unit releasably mounted on said carrier vehicle, wherein each said capturing unit respectively is equipped with at least one braking thrust nozzle, a propellant charge communicating with said at least one braking thrust nozzle, and a capture net that is deployable from said capturing unit and is releasably connected to said capturing unit by a single tether line that is connected to a closed central apex of said capture net, wherein a respective single one of said capture net is connected by said single tether line to only a single said capturing unit.

5. The system according to claim 4, wherein said at least one capturing unit comprises a plurality of said capturing units independently releasably mounted on said carrier vehicle.

6. The system according to claim 4, wherein said carrier vehicle is further equipped with releasable connection clamps that releasably mount said at least one capturing unit on said carrier vehicle.

7. The system according to claim 4, wherein at least a selected one said capturing unit is transportable along said carrier vehicle so that said selected capturing unit can be transported from an initial position to a forward position at a front edge of said carrier vehicle where said capture net can then be deployed from said selected capturing unit.

8. The system according to claim 4, wherein each single said capturing unit respectively is releasably connected by said single tether line thereof to said single capture net thereof.

9. The system according to claim 4, wherein each said capturing unit respectively is further equipped with a cable severing device arranged and adapted to sever said tether line so as to release said capturing unit from said capture net.

10. The system according to claim 4, wherein said carrier vehicle is further equipped with a first radio, each said capturing unit respectively is further equipped with a second radio, and said first and second radios establish a radio communication link between said carrier vehicle and said respective capturing unit.

11. The system according to claim 10, wherein said carrier vehicle further has a direct radio communication link with a ground control station, and each said capturing unit respectively has only said radio communication link with said carrier vehicle and no direct radio communication link with said ground control station.

12. The system according to claim 4, wherein said at least one braking thrust nozzle is arranged and oriented to produce a thrust vector, upon ignition of said propellant charge, wherein said thrust vector is oriented in a direction opposite said tether line and said capture net and opposite an open end of said capture net.

13. The system according to claim 4, wherein each said capturing unit respectively has no navigation facility and no control system and no controllable thruster for active position and attitude control.

14. The system according to claim 4, wherein said carrier vehicle is further equipped with a navigation unit.

15. A method of capturing and deorbiting an orbital object using the system according to claim 4, comprising steps:
   a) operating said at least one engine of said carrier vehicle to position said carrier vehicle at a capturing range and a capturing position relative to said orbital object;
   b) deploying said capture net from a first said capturing unit and capturing said orbital object in said capture net;
   c) operating said at least one engine of said carrier vehicle to apply tension to said tether line connected to said capture net in which said orbital object is captured, so as to properly orient and stabilize a connected combination including said first capturing unit and said orbital object captured in said net;
   d) releasing said first capturing unit from said carrier vehicle so that no mechanical connection remains between said first capturing unit and said carrier vehicle; and
   e) igniting said propellant charge of said first capturing unit so as to produce a braking thrust from said at least one braking thrust nozzle of said first capturing unit, whereby said orbital object captured in said capture net is decelerated in its orbit and deorbited.

16. The method according to claim 15, further comprising, after said step b), deploying said capture net from a second said capturing unit and capturing said orbital object in said capture net of said second capturing unit, in addition to having captured said orbital object in said capture net of said first capturing unit.

17. The method according to claim 16, further comprising releasing said second capturing unit from said carrier vehicle, and combining said first and second capturing units in a series connection.

18. The method according to claim 16, further comprising releasing said second capturing unit from said carrier vehicle, and combining said first and second capturing units in a parallel connection.

* * * * *